J. H. Preston
Sawing Mach.

No. 87,430.  Patented Mar. 2, 1869.

Witnesses:
P. C. Dieterich
Frank Blackley

Inventor:
J. H. Preston
Per Munn & Co.
Attorneys

UNITED STATES PATENT OFFICE.

JAMES H. PRESTON, OF JEFFERSON CITY, MISSOURI.

IMPROVEMENT IN CARRIAGE FOR SAWING SADDLE-TREE STUFF.

Specification forming part of Letters Patent No. 87,430, dated March 2, 1869.

*To all whom it may concern:*

Be it known that I, JAMES H. PRESTON, of Jefferson City, in the county of Cole and State of Missouri, have invented a new and Improved Carriage for Sawing Saddle-Tree Stuff; and I do hereby declare that the following is a full, clear, and exact description thereof, which will enable those skilled in the art to make and use the same, reference being had to the accompanying drawings, forming part of this specification, in which—

Figure 1:
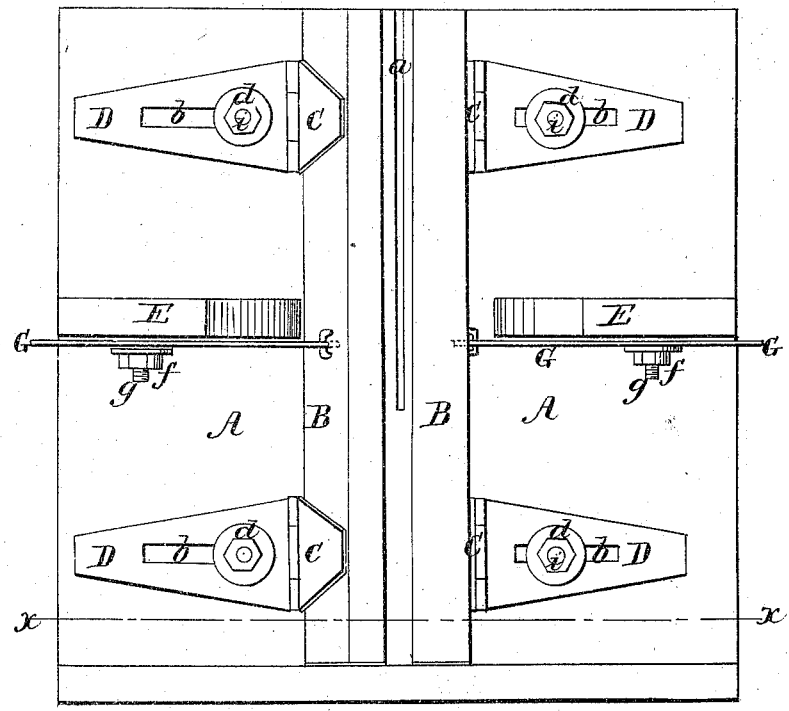
Figure 2:
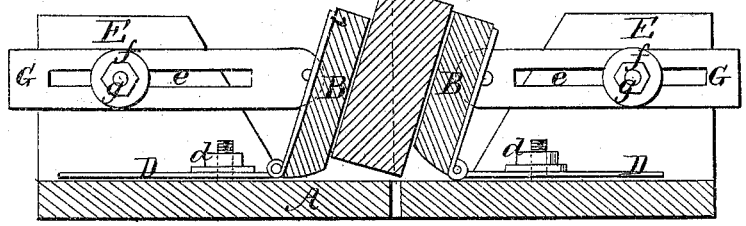

Figure 1 is a plan view of my invention. Fig. 2 is a cross-section of the same through the line $x\,x$, Fig. 1.

Similar letters of reference indicate corresponding parts.

The object of this invention is to facilitate the construction of saddle-trees.

Heretofore it has been customary, in the manufacture of saddle-trees, to split or rive the billets of wood, in order to give them the proper triangular cross-section preparatory to working them down into "bars," "cantles," "heads," and "side trees," so called, and other accessory parts of saddle-trees that require to be beveled more or less.

By means of my invention these enumerated parts may be sawed with the proper bevel or triangular cross-section, and a great saving thereby effected in time and material, and timber can be utilized that would not be available in the old method; and in sawing out the stuff the operator obtains a fair surface, which enables him to put the work in a scroll-saw or molding-machine in cutting the curved outlines, thereby securing uniformity of execution.

Lastly, my invention enables him to work up timber that is procured at any saw-mill, thus obviating the necessity of having the stuff split out by hand, or otherwise, with the general bevel or triangular cross-section, as before stated.

My invention consists, in general terms, of a bed or bottom plate, provided on its upper side with two adjustable rests on each side of a saw-slit in the said bed, and provided with means of holding the said rests at the desired position in which they are set for any particular kind of work. The carriage is movable on the saw-table, and may be provided with guides of any suitable nature, to obtain uniformity in the work, without the exercise of skill in guiding the carriage by hand.

In the drawings, A is the bed, of wood or metal, having a saw-slit, $a\,a$, extending over half of its length. B B are the rests, being pieces of wood or metal, having their lower edges somewhat beveled, to allow them to be inclined forward toward the saw when the nature of the work requires such position. The rests are arranged on each side of the saw-slit, as shown, and are connected with the bed by hinges C D, which, from their construction, enable the rests to be moved laterally to or from the saw-slit, to receive between them stuff of different size. The hinges are also provided with devices for clamping them securely at any desired position within the limit of their lateral adjustment.

There are various methods of obtaining such adjustment; but I have shown a simple and effective method, which is perhaps the best, and will thoroughly answer the purpose required. It is as follows: The parts C of the hinges are permanently affixed to the rests by bolts or screws, while the parts D are formed with slots $b$, each of which incloses a threaded stud, $i$, affixed in and projecting upward from the bed. These studs are provided with clamp-nuts $d$, which, when loosened up, permit the movement of the pawls D, but when turned down sufficiently hold the said parts firmly in place. The incline or angle of the rests is adjusted and fixed by means of slotted plates G, one end of which is attached to the rests, as shown, by staples or other suitable means, and the plates are clamped against blocks E, fixed on the bed, as shown, by means of clamp-nuts $f$, working in the threaded studs $g$, projecting from the blocks E through the slots $e$ of the said plates G, the proximate edges of the said blocks being sloped or beveled to allow the maximum opening of the rests that may be required.

I is a molding fixed to the bed, and against which the ends of the stuff held in the rests abut.

A circular saw is generally used in the slit $a\,a$.

In using my invention the wood is placed in the rests, and the latter inclined, as shown in Fig. 2, to cut more or less diagonally across the rectangular section of the wood, as shown.

Thus wood as it comes from the mill may be used; or even round or irregular wood may be worked up by the saw into beveled pieces suitable for saddle-tree stuff.

I claim as new and desire to secure by Letters Patent—

The arrangement upon the bed A of the beveled rests B B, adjustable hinges C D, beveled blocks E, and slotted adjusting-plates G, when all the parts are constructed as described, for the purpose specified.

JAS. H. PRESTON.

Witnesses:
   J. W. PINGREE,
   CHARLES L. WELLS.